ELECTRIC MOTOR MOUNTING ARRANGEMENT
Filed March 14, 1966
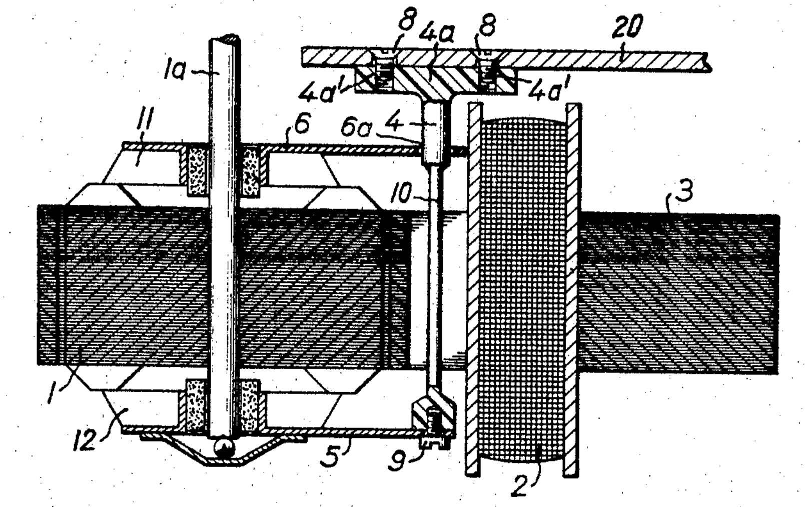
Inventors:
Hans-Joachim Janssen
Reinhold Schütte
By: Spencer & Kaye
Attorneys

United States Patent Office 3,434,723

Patented Mar. 25, 1969

3,434,723

ELECTRIC MOTOR MOUNTING ARRANGEMENT

Hans-Joachim Janssen, Hundsmuhlen, and Reinhold Schütte, Oldenburg, Germany, assignors to Licentia Patentverwaltungs-G.m.b.H., Frankfurt am Main, Germany Filed Mar. 14, 1966, Ser. No. 533,982

Int. Cl. G11b *17/00*

U.S. Cl. 274—1 10 Claims

ABSTRACT OF THE DISCLOSURE

An arrangement for mounting a structurally unsymmetrical driving motor in the housing of a piece of sound reproducing equipment. The arrangement includes a rigid mounting arm secured to and projecting radially from at least one of the two bearing plates of the motor, and a torsion bar, arranged in the centroidal axis of the motor, interconnecting at least one of the arms and the housing.

The present invention relates to a piece of sound reproducing equipment, such as a phonographic record player.

More particularly, the present invention relates to a mounting arrangement which is especially adapted for use in a record player which is of simple construction and which is driven by a small shaded pole motor. A shaded pole-type motor is mechanically unsymmetrical and incorporates a yoke ring carrying a winding. The motor can be coupled to the housing or chassis of a record player by means of a rubber mounting element which serves to insulate the record player from vibrations of the motor.

The coupling which is afforded by the rubber element should, on the one hand, be mechanically sufficiently stable, but, on the other hand, should be able to bring with it a sufficiently high coefficient of insulation. In order to meet the first requirement, namely, that of mechanical stability and strength, the mounting element should be made of firm hard rubber, while, in order to meet the second requirement, the mounting element should be made of very soft rubber. In practice, therefore, these mutually contradictory requirements had to be satisfied by making compromises, and the compromise solutions will not be ideal insofar as the requirements of secure coupling and the requirements of vibration insulation are concerned. These drawbacks are particularly noticeable in the case of record players incorporating small structurally unsymmetrical shaded pole type motors in which the torsion axis, i.e., the axis of the rotary vibration does not coincide with the axis of the rotor.

It is, therefore, the primary object of the present invention to provide a way in which to overcome the above drawbacks and, in accordance with the present invention, this is accomplished by coupling the unsymmetrical drive motor to the housing of the record player by means of a centroidal bar which lies in the torsion axis of the motor. To this end, the shaded pole motor is provided with rigid, radially oriented mounting arms which hold the torsion bar. The head of the torsion bar is rigidly connected to the housing of the record player.

According to one embodiment of the invention, the head of the torsion bar is enlarged and given a shape so that it is suitable for serving as a mounting plate so that the torsion bar can be secured to the housing by means of screws. The two ends of the shaft portion of the torsion bar, which itself is positioned to lie in the axis of the torsional oscillations of the drive motor, pass sides through openings in the radial mounting arms.

In accordance with the present invention, the outer end of the torsion bar can be nonrotatably connected with a small mounting arm whereas the shaft part, in the middle region of the torsion bar, is slidably seated in the other mounting arm.

For reasons of economy, the torsion bar may be made of plastic, so as to reduce the cost of manufacture.

In accordance with another feature of the present invention, the central part of the shaft of the torsion bar may have a reduced cross section, or the free end of the bar may have an enlarged cross section. This enlarged cross section at the free end is provided with an axially directed internal thread which receives a set screw for rigidly connecting the respective mounting arm with the torsion bar.

Additional objects and advantages of the present invention will become apparent upon consideration of the following description when taken in conjunction with the accompanying drawing in whch the sngle figure is a sectional view of one embodiment of the present invention.

Referrng now to the drawing, the same shows a mechanically, i.e., structurally unsymmetrical motor 1, e.g., a small shaded pole motor, having a winding 2, a yoke ring 3, and two axially spaced apart bearing plates 11 and 12 which rotatably support a drive shaft 1*a*. The bearing plates are connected to rigid mounting arms or straps 6 and 5 which emanate radially from the bearing plates and extend in the same direction, the motor being coupled to a torsion bar 4 through the intermediary of these arms. The upper arm 6 encompasses the torsion bar 4 in such a manner as to allow the same to slide within an opening 6*a* provided in the arm 6, whereas the arm 5 is fixedly connected with the torsion bar 4 by means of a screw 9.

The upper end 4*a* of the torsion bar 4 is fixedly and rigidly connected to the housing of the record player, shown fragmentarily at 20, by means of screws 8 which are received in threaded bores 4*a'* of the head 4*a*. The torsion bar 4, shown in the drawing, as having a reduced cross section in the region of the central shaft part 10, lies in the torsion axis of the motor, i.e., in the aixs of the torsional vibrations, this axis being spaced from that of the shaft 1*a*.

Thanks to the above-described mounting arrangement the driving motor is, from a mechanical point of view, coupled rigidly to the record player, while the motor is nonetheless coupled in such a manner that torsional vibrations of approximately 100 cycles per second are insulated with respect to the record player.

It will thus be seen that, in accordance with the present invention, there is provided an arrangement for mounting in the housing of a piece of sound reproducing eqiupment a structurally unsymmetrical driving motor which has two bearing plates on which the motor drive shaft is rotatably supported, the mounting being such that the piece of equipment is insulated with respect to 100 cycles per second vibrations of the motor. This is achieved by virtue of the fact that the two rigid mounting arms which emanate radially from the bearing plates and extend in the same direction, to the torsion axis—which torsion axis itself is spaced from the axis of the drive shaft—are coupled to the torsion bar which is arranged in the torsion axis of the motor, one end of the torsion bar being fixedly connected to the housing of the piece of sound reproducing equipment.

As described above, the arm which is coupled to the torsion bar at its free end, is fixedly secured thereto, while the other arm, i.e., the arm which is coupled to the torsion bar in the region of the end that is secured to the housing—and this region may, in practice, extend as far down as the central part of the torsion bar—is slidably coupled to the torsion bar.

The present invention is not limited to the illustrated embodiment but can be used in other circumstances whenever small driving motors are to be mounted in such a manner that the vibrations be insulated. The arrangement may incorporate a torsion bar which has a rigid axis which coacts resiliently with a rotary bearing. Both extremely high coefficient of insulation of the torsion bar and rigid mechanical coupling are attained because the transformation of the spring constant for insulating the torsional vibration assumes the highest attainable value.

It will be understood that the above description of the present invention is susceptible to various modifications, changes, and adaptations, and the same are intended to be comprehended within the meaning and range of equivalents of the appended claims.

What is claimed is:

1. The combination which comprises:
(a) a piece of sound reproducing equipment having a housing;
(b) a small, structurally unsymmetrical driving motor having two axially spaced apart bearing plates and a drive shaft is rotatably supported on said bearing plates, said motor having a centroidal axis which is spaced from the axis of said drive shaft;
(c) two rigid mounting arms secured to and projecting radially from said bearing plates, respectively, and extending in the same direction and to said centroidal axis; and
(d) a torsion bar arranged in said centroidal axis of said motor and being connected to at least one of said two arms, said torsion bar having one end connected to said housing of said piece of sound reproducing equipment.

2. The combination defined in claim 1 wherein one of said arms is in slidable contact with said torsion bar at a point thereon which is in the region of said one end thereof and the other of said arms is connected to said torsion bar in the region of its other end.

3. An arrangement for mounting in the housing of a piece of sound reproducing equipment a structurally unsymmetrical driving motor which has two bearing plates, the arrangement comprising, in combination:
(a) a rigid mounting arm secured to and projecting radially from one of the two bearing plates of the motor; and
(b) a torsion bar arranged in the centroidal axis of the motor, said torsion bar being connected to said mounting arm, said torsion bar having one end connected to the housing of the piece of sound reproducing equipment.

4. An arrangement as defined in claim 3, wherein the connection between said mounting arm and said torsion bar and the connection between said torsion bar and the housing form means for insulating the housing and the remainder of the piece of sound reproducing equipment with respect to approximately 100 cycles per second torsional vibrations of the motor.

5. An arraangement as defined in claim 3, wherein said one end of said torsion bar is in the form of an enlarged head, the same being provided with bores therethrough for enabling said head to be secured to the housing.

6. An arrangement as defined in claim 3, wherein said torsion bar is made of plastic.

7. An arrangement as defined in claim 3, further comprising a second mounting arm secured to and projecting radially from the other of said two bearing plates, said second arm guiding said torsion bar in the region of said one end thereof and the first-mentioned one of said arms being connected to said torsion bar in the region of the other end thereof.

8. An arrangement as defined in claim 3, further comprising a second mounting arm secured to and projecting radially from the other of the two bearing plates, the first-mentioned one of said arms being connected to said torsion bar and said second arm being in slidable contact with said torsion bar.

9. An arrangement as defined in claim 8, wherein said second arm is in slidable contact with said torsion bar in the region of said one end thereof and said first-mentioned arm is connected to said torsion bar in the region of the other end thereof.

10. An arrangement as defined in claim 9, further comprising screw means for connecting said first-mentioned arm to said other end of said torsion bar.

References Cited

UNITED STATES PATENTS

| | | | |
|---|---|---|---|
| 2,490,209 | 12/1949 | Cornwall | 310—172 |
| 3,043,970 | 7/1962 | Hatten et al. | 310—91 |

HARRY N. HAROIAN, *Primary Examiner.*

U.S. Cl. X.R.

310—91, 51